US 9,846,348 B2

(12) United States Patent
Luk et al.

(10) Patent No.: US 9,846,348 B2
(45) Date of Patent: Dec. 19, 2017

(54) PHOTON ENERGY CONVERSION BY NEAR-ZERO PERMITTIVITY NONLINEAR MATERIALS

(71) Applicant: National Technology & Engineering Solutions of Sandia, LLC, Albuquerque, NM (US)

(72) Inventors: Ting S. Luk, Albuquerque, NM (US); Michael B. Sinclair, Albuqueruqe, NM (US); Salvatore Campione, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 15/040,799

(22) Filed: Feb. 10, 2016

(65) Prior Publication Data

US 2017/0227830 A1   Aug. 10, 2017

(51) Int. Cl.
*G02F 1/35* (2006.01)
*G02F 1/37* (2006.01)
*G02F 1/355* (2006.01)

(52) U.S. Cl.
CPC .......... *G02F 1/353* (2013.01); *G02F 1/3556* (2013.01); *G02F 1/37* (2013.01); *G02F 2001/354* (2013.01); *G02F 2202/101* (2013.01); *G02F 2202/16* (2013.01); *G02F 2202/30* (2013.01)

(58) Field of Classification Search
None
See application file for complete search history.

(56) References Cited

U.S. PATENT DOCUMENTS

| | | | |
|---|---|---|---|
| 4,867,510 A * | 9/1989 | Dobson | G02F 1/377 359/328 |
| 6,421,128 B1 * | 7/2002 | Salamon | G01N 21/33 356/445 |
| 2002/0021445 A1 * | 2/2002 | Bozhevolnyi | B82Y 20/00 356/445 |
| 2014/0170024 A1 * | 6/2014 | Fujimaki | G01N 21/553 422/69 |
| 2016/0178516 A1 * | 6/2016 | Abdulhalim | G01N 29/022 356/364 |

(Continued)

OTHER PUBLICATIONS

Vincenti, M.A. et al., "Singularity-Driven Second-and Third-Harmonic Generation at E-Near-Zero Crossing Points", Physical Review A, 2011, pp. 063829-1-063826-4, vol. 84.

(Continued)

*Primary Examiner* — Hemang Sanghavi
(74) *Attorney, Agent, or Firm* — Kevin W. Bieg

(57) ABSTRACT

Efficient harmonic light generation can be achieved with ultrathin films by coupling an incident pump wave to an epsilon-near-zero (ENZ) mode of the thin film. As an example, efficient third harmonic generation from an indium tin oxide nanofilm ($\lambda/42$ thick) on a glass substrate for a pump wavelength of 1.4 μm was demonstrated. A conversion efficiency of $3.3 \times 10^{-6}$ was achieved by exploiting the field enhancement properties of the ENZ mode with an enhancement factor of 200. This nanoscale frequency conversion method is applicable to other plasmonic materials and reststrahlen materials in proximity of the longitudinal optical phonon frequencies.

14 Claims, 5 Drawing Sheets

(56) References Cited

U.S. PATENT DOCUMENTS

2016/0227639 A1* 8/2016 Kaminer .................. H05G 2/00

OTHER PUBLICATIONS

Vincenti, M.A. et al., "Harmonic Generation in Multiresonant Plasma Films", Physical Review A, 2013, pp. 043812-1043812-5. vol. 88.
Vassant, S. et al., "Berreman Mode and Epsilon Near Zero Mode", Optics Express, 2012, pp. 23971-23977, vol. 20.
Luk, T. S. et al., "Directional Perfect Absorption Using Deep Subwavelength Low-Permittivity Films", Physical Revew B, 2014, pp. 085411-1-085411-10, vol. 90.
Campione, S. et al., "Electric Field Enhancement in E-Near-Zero Slabs Under TM-Polarized Oblique Incidence", Physical Review B, 2013, pp. 035120-1-035120-11, vol. 87.
Luk, T.S. et al., "Enhanced Third Harmonic Generation From the Epsilon-Near-Zero Modes of Ultrathin Films", On-line Feb. 13, 2015 arxiv publication: http://arxiv.org/abs/1502.04142.
Luk, T.S. et al., "Enhanced Third Harmonic Generation From the Epsilon-Near-Zero Modes of Ultrathin Films", Applied Physics Letters, 2015, pp. 151103-1-151103-5, vol. 106.
Luk, T.S. et al., "Third Harmonic Generation in Ultrathin Epsilon-Near-Zero Media", 2015 Conference on Lasers and Electro-Optics (CLEO), DOI:10.1364/CLEO_SI.2015.STh3H.7.

* cited by examiner

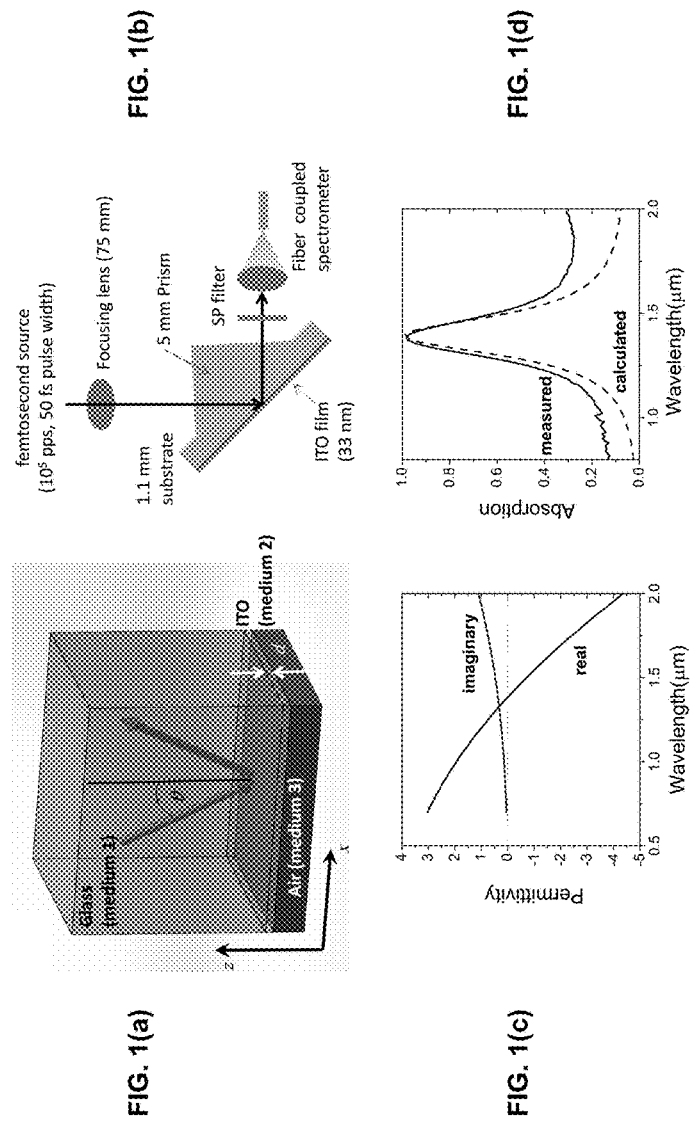

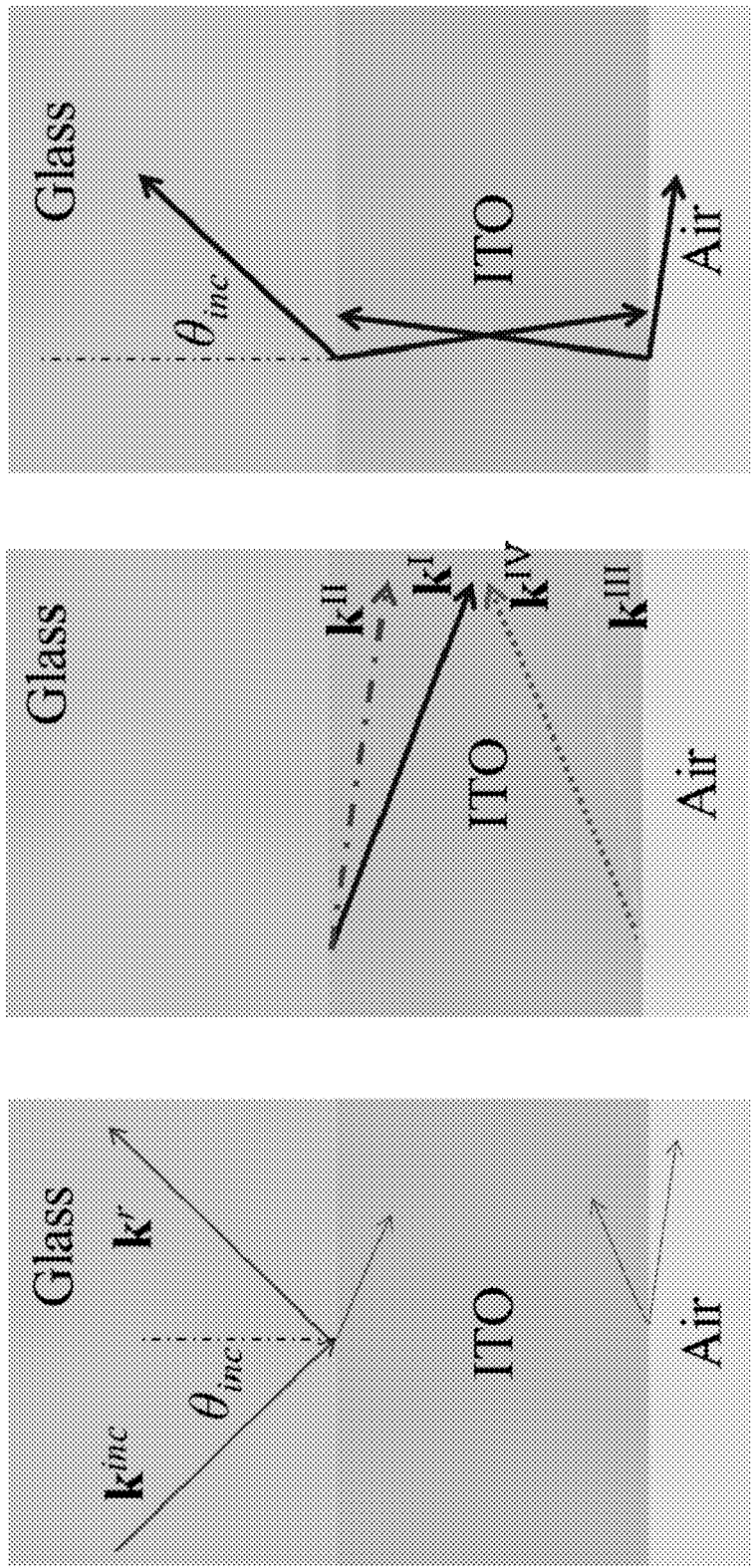
FIG. 3(a) FF waves
FIG. 3(b) Bound TH
FIG. 3(c) Free TH

PHOTON ENERGY CONVERSION BY NEAR-ZERO PERMITTIVITY NONLINEAR MATERIALS

STATEMENT OF GOVERNMENT INTEREST

This invention was made with Government support under contract no. DE-AC04-94AL85000 awarded by the U. S. Department of Energy to Sandia Corporation. The Government has certain rights in the invention.

FIELD OF THE INVENTION

The present invention relates to photon energy conversion and, in particular, to harmonic light generation by near-zero permittivity nonlinear materials.

BACKGROUND OF THE INVENTION

Third harmonic (TH) generation is a commonly used nonlinear optical process that triples the input photon energy. Large conversion efficiency in traditional nonlinear optical devices requires large nonlinearities, low material absorption, and phase-matching techniques that increase the interaction length to the millimeter-to-centimeter range. Phase matching is irrelevant at the nanoscale, and new strategies must be developed to boost the performance of sub-wavelength nonlinear optical devices which are expected to play an important role in optoelectronics and optical information processing. Several approaches involving high-Q photonic modes have been proposed, including ring cavity modes, guided mode resonances, photonic crystal band edges, and defect states of periodic structures. See M. Kauranen and A. V. Zayats, *Nature Photonics* 6, 737 (2012). Recently, metallic and more generally plasmonic nanostructures have received considerable attention. See J. A. Schuller et al., *Nat Mater* 9, 193 (2010); and A. V. Zayats et al., *Physics Reports* 408 (2005). While the Q-factors of plasmonic resonators are usually smaller than those achieved with all-dielectric photonic devices, larger field enhancements are possible since plasmonic modal volumes can be deeply sub-wavelength. However, harmonic generation using the sub-wavelength structures reported thus far relies on field enhancements associated with localized surface plasmon resonances or collective resonances that require exquisite fabrication techniques. See M. Kauranen and A. V. Zayats, *Nature Photonics* 6, 737 (2012); L. Scaccabarozzi et al., *Opt. Lett.* 31, 3626 (2006); B. Corcoran et al., *Nat Photon* 3, 206 (2009); J. Lee et al., *Nature* 511, 65 (2014); and S. Campione et al., *Applied Physics Letters* 104, 131104 (2014).

Therefore, a need remains for a means for harmonic light generation in a sub-wavelength nonlinear optical device.

SUMMARY OF THE INVENTION

Efficient harmonic generation can be achieved with ultrathin films by coupling an incident pump wave to an epsilon-near-zero (ENZ) polariton mode of the thin film. Therefore, the method for photon energy conversion of the present invention comprises providing a thin film of a material having an ENZ polariton mode at a plasma frequency at which the dielectric permittivity is near zero and coupling incident light with wavelength equivalent to the plasma frequency to the ENZ polariton mode of the thin film, thereby generating light at a different frequency from the incident light by a nonlinear optical process. For example, third harmonic light can be generated from a third-order up-conversion process. The thin film material can comprise a doped semiconductor or conductive oxide, such as indium-tin-oxide (ITO) or cadmium oxide, a plasmonic metamaterial, or a reststrahlen material. Conversely, subharmonic light can be generated at a lower frequency by a down-conversion process.

The invention has been demonstrated in a deeply sub-wavelength ITO thin film. Exploiting the field enhancement effect resulting from efficient coupling to the ENZ mode through a Kretschmann geometry, the TH yield can be more than 200 times larger than that when the pump wave is incident from air in the non-Kretschmann geometry, and more than 10,000 times larger than when only a glass prism is present (i.e. no ITO nanolayer). Because the ENZ wavelength is very sensitive to the electron density, the potential exists for active tuning via electrical modulation. Furthermore, the extremely small length scales involved render the need for phase matching irrelevant. See M. Vincenti et al., *Physical Review A* 84, 063826 (2011); and M. A. Vincenti et al., *Physical Review A* 88, 043812 (2013). Since the conditions used in this invention can be easily met in other plasmonic and low-loss reststrahlen materials, the invention provides a general method for harmonic conversion for infrared and ultraviolet radiation in deeply sub-wavelength environments.

BRIEF DESCRIPTION OF THE DRAWINGS

The detailed description will refer to the following drawings, wherein like elements are referred to by like numbers.

FIG. 1(*a*) is a schematic illustration of the Kretschmann excitation geometry. FIG. 1(*b*) is a schematic illustration of the components of the optical setup for a TH measurement. FIG. 1(*c*) is a graph of the real and imaginary parts of the permittivity of the ITO sample versus wavelength. FIG. 1(*d*) is a graph of the measured (solid) and calculated (dashed) p-polarized absorption profile at 43.7 degrees versus wavelength.

FIG. 2(*b*) is a graph of the angular dependence of TH yield as a function of incident angle for incidence wavelengths of 1.3 μm and 1.4 μm at $I_{FF}$ intensity of 1.2×10$^{10}$ W/cm$^2$. The dashed lines are full-wave simulation results for corresponding excitation conditions. Due to the uncertainty of the absolute experimental angle, the theoretical result was shifted by 2 degrees. FIG. 2(*c*) is a graph of the TH yield versus angle of incidence of 1.4 μm pump wave for the Kretschmann and non-Kretschmann geometries shown as insets.

FIG. 3(*a*) is an illustration of FF waves in the glass input medium, ITO film, and air. FIG. 3(*b*) is an illustration of bound TH waves in the ITO film. The arrows labeled with roman numbers correspond to the bound, inhomogeneous TH sources in Eq. (2). FIG. 3(*c*) is an illustration of free TH waves in the glass input medium, ITO film, and air. The solid arrows represent the free, homogeneous TH components.

FIG. 4(*b*) is a graph of the transmitted TH efficiency versus frequency. The dashed white lines indicate the critical angle of 41.8 degrees.

DETAILED DESCRIPTION OF THE INVENTION

Figure 2B:
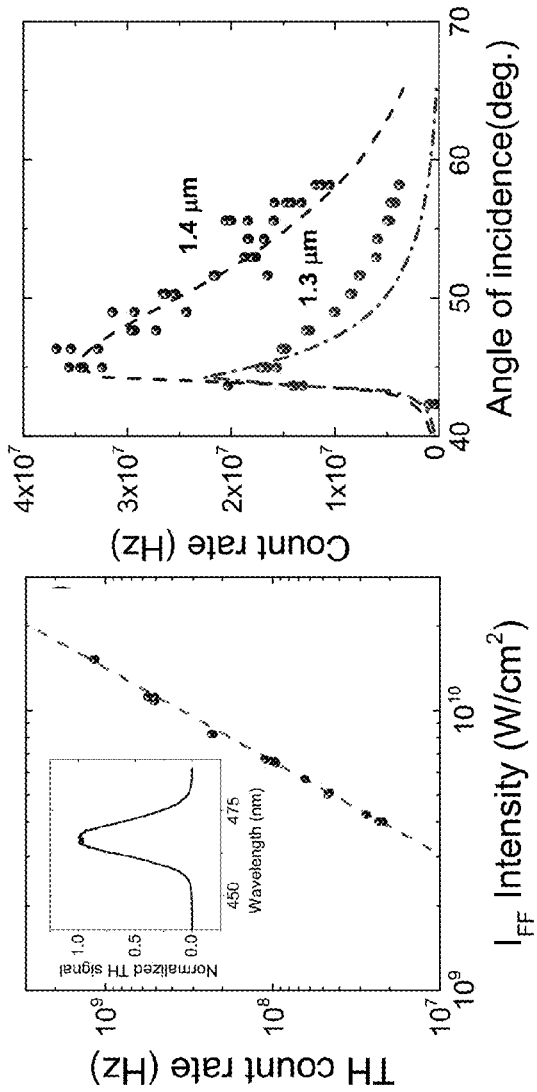
FIG. 2(*a*) is a graph of the $I_{FF}$ intensity dependence of TH yield for a 1.4 μm (7246 cm$^{-1}$) incidence wavelength. The inset shows the TH spectrum.

Frequency-mixing from interfaces and thin nonlinear films has been intensely investigated since the early days of nonlinear optics, with several studies exploiting the field enhancement associated with the excitation of short- and long-range surface plasmon polaritons. See N. Bloembergen and P. S. Pershan, *Physical Review* 128, 606 (1962); C. C. Wang, *Physical Review* 178, 1457 (1969); H. Simon et al., *Physical Review Letters* 33, 1531 (1974); J. C. Quail et al., *Physical Review Letters* 50, 1987 (1983); and H. Raether, *Surface plasmons on smooth and rough surfaces and on gratings* (Springer-Verlag, 1986). More recently, intriguing light-matter interactions occurring in natural or artificial epsilon-near-zero (ENZ) materials have come under scrutiny. The present invention is directed to a method to enhance harmonic generation using the ENZ polariton mode supported by deeply sub-wavelength, un-patterned films. See S. Vassant et al., *Opt Express* 20, 23971 (2012). As described below, indium-tin-oxide (ITO), a common transparent conductive oxide, is used as an example to demonstrate the invention. However, the results can be generally extended to other materials, such as cadmium oxide or reststrahlen materials, that exhibit ENZ behavior and nonlinear properties.

In natural media, epsilon-near-zero behavior occurs at the plasma frequency—the frequency at which the real part of a material's dielectric constant crosses zero. Plasma frequencies in the ultraviolet and visible ranges are typical for metals, while heavily-doped semiconductors or conductive oxides, such as ITO, exhibit zero-crossing frequencies in the near-infrared. Moreover, ENZ may be synthesized at virtually any frequency with properly designed metamaterials, using sub-wavelength arrangements of plasmonic resonators or using guided modes operating near the cutoff frequency. Many optical effects and potential applications arising from ENZ behavior have been proposed or demonstrated including optical tunneling, phase patterning, directional emission, perfect absorption, dielectric sensing, guided index lensing, enhanced emission, optical cloaking, strong coupling phenomena, optical modulation, thermo-photovoltaics, and enhanced optical nonlinearities. See M. Silveirinha and N. Engheta, *Physical Review Letters* 97, 157403 (2006); B. Edwards et al., *Physical Review Letters* 100, 033903 (2008); R. Liu et al., *Physical Review Letters* 100, 023903 (2008); A. Alù et al., *Physical Review B* 75, 155410 (2007); S. Enoch et al., *Physical Review Letters* 89, 213902 (2002); S. Feng and K. Halterman, *Physical Review B* 86, 165103 (2012); T. S. Luk et al., *Physical Review B* 90, 085411 (2014); A. Alù and N. Engheta, *Physical Review B* 78, 045102 (2008); V. Torres et al., *Optics Express* 21, 9156 (2013); A. Alù and N. Engheta, *Physical Review Letters* 103, 043902 (2009); A. Alù and N. Engheta, *Materials* 4, 141 (2011); R. Fleury and A. Alù, *Physical Review B* 87, 201101 (2013); E. Liznev et al., *Applied Physics A: Materials Science & Processing* 100, 321 (2010); D. J. Shelton et al., *Nano Letters* 11, 2104 (2011); Y. C. Jun et al., *Nano Letters* 13, 5391 (2013); B. Askenazi et al., *New Journal of Physics* 16, 043029 (2014); S. Vassant et al., *Physical Review Letters* 109, 237401 (2012); V. J. Sorger et al., *Nanophotonics* 1 (2012); S. Molesky et al., *Optics Express* 21 (2013); M. Vincenti et al., *Physical Review A* 84, 063826 (2011); C. Argyropoulos et al., *Physical Review B* 85, 045129 (2012); and D. de Ceglia et al., *Physical Review B* 87, 155140 (2013).

Bulk plasmon modes (which occur at the ENZ frequency) in infinite homogenous media are longitudinal in nature and cannot interact with transverse electromagnetic fields. However, in ultrathin plasmonic materials an external plane wave can couple to the volume plasmon. See R. A. Ferrell, *Physical Review* 111, 1214 (1958). When this coupling is achieved to the left of the light line, the volume plasmon polariton mode is sometimes referred to as the Berreman mode, to which one can couple directly from free space. When this coupling is achieved to the right of the light line, the volume plasmon polariton mode is sometimes referred to as the epsilon-near-zero (ENZ) mode. See S. Vassant et al., *Opt Express* 20, 23971 (2012). Under the right conditions, an external plane wave can be coupled to the ENZ mode and be completely absorbed in a deeply sub-wavelength film. See T. S. Luk et al., *Physical Review B* 90, 085411 (2014). For thin-film configurations that exhibit low reflectivity near the ENZ frequency, the continuity of the normal component of the electric displacement necessarily requires the existence of a large electric field immediately inside the film. See S. Campione et al., *Physical Review B* 87, 035120 (2013). However, such low reflectivity can only be achieved through excitation of a thin film resonance, which in the present invention is the ENZ mode. This field enhancement can, in turn, lead to substantial increases in nonlinear optical processes, such as harmonic generation, which depend on superlinearly of the field amplitude at the fundamental frequency. This concept has been proposed theoretically as a simple and effective way to enhance second and third harmonic generation in ENZ slabs illuminated by p-polarized light at oblique incidence in a symmetric substrate/superstrate configuration. See M. Vincenti et al., *Physical Review A* 84, 063826 (2011). The present invention is directed to an approach to strengthen the coupling to the ENZ polariton mode and further increase the nonlinear response. In particular, the excitation of the ENZ mode under total reflection conditions (i.e. above the glass/air critical angle) can enhance the reflected third harmonic generation by two orders of magnitude due to ENZ field enhancement. Although the structure described in Vassant et al. reference is different from the one used in the present invention (metal substrate in Vassant et al. and glass in the present invention), many of the important properties of the ENZ modes are similar for the two configurations. See S. Vassant et al., *Opt Express* 20, 23971 (2012).

To excite the ENZ mode in a resonant manner, the incoming light beam must match its momentum to that of the polariton. In the case of p-polarized light (polarization parallel to the plane of incidence), this can be achieved by passing the light through a block of glass to increase the wavenumber (and the momentum), and achieve the resonance at a given wavelength and angle. In a Kretschmann configuration, the thin film is evaporated onto a glass block, typically a prism. The light illuminates the back wall of the glass block at the critical angle and is totally internally reflected. An evanescent wave penetrates into the thin film, exciting the ENZ polariton mode that propagates in a direction parallel to the thin film. This field enhancement can enable efficient harmonic generation by a nonlinear optical process in proximity to the zero crossing point of the dielectric permittivity in the thin film material.

In the example shown in FIG. 1(a), the ENZ sample comprised a 33 nm thick ITO layer (medium 2) deposited on 1.1 mm thick alum ino-silicate glass substrate (medium 1).

In the frequency ranges investigated, ITO has a moderately large third order susceptibility which is comparable to that of Si or GaAs. The origin of the large third order nonlinear susceptibility of ITO is due to delocalized electrons with large mobility, analogous to pi-electrons in polymers. See J. L. Humphrey and D. Kuciauskas, *Journal of Applied Physics* 100 (2006); N. Ueda et al., *Applied Physics Letters* 59, 502 (1991); and H. I. Elim et al., *Applied Physics* B 82, 439 (2006). A schematic of the excitation geometry and optical setup is shown in FIG. 1(b).

The dielectric permittivity of the ITO film was determined from an isotropic Drude model fit to measured ellipsometry data $$\varepsilon_{ITO} = \varepsilon_\infty - \frac{\omega_p^2}{\omega^2 + i\omega\gamma}$$

with parameters $\varepsilon_\infty = 4.0824$, $\omega_p^2 = 7.643 \times 10^{30}$ rad$^2$/s$^2$ ($\omega_p^2 = 2.1511 \times 10^8$ cm$^{-2}$), and $\gamma = 1.239 \times 10^{14}$ rad/s ($\gamma = 657.31$ cm$^{-1}$), as shown in FIG. 1(c)), and the ENZ wavelength is determined to be 1.385 μm (7220 cm$^{-1}$). The dielectric permittivity of glass is equal to 2.25 at this wavelength. For efficient TH generation, the Kretschmann excitation scheme can be used to optimize the coupling to the ENZ mode. This is used because the ENZ mode lies on the right side of the light line as described in Vassant et al., and the glass prism index-matched to the glass substrate provides the required momentum to couple to the ENZ mode. See S. Vassant et al., *Opt Express* 20, 23971 (2012). The signature of efficient coupling to the ENZ mode is the near-perfect absorption feature of incident p-polarized light at the specific angle of incidence of 43.7 degrees. As shown in FIG. 1(d), the measured absorption agrees well with the transfer matrix calculation based on the fitted dielectric function.

Figure 2A:
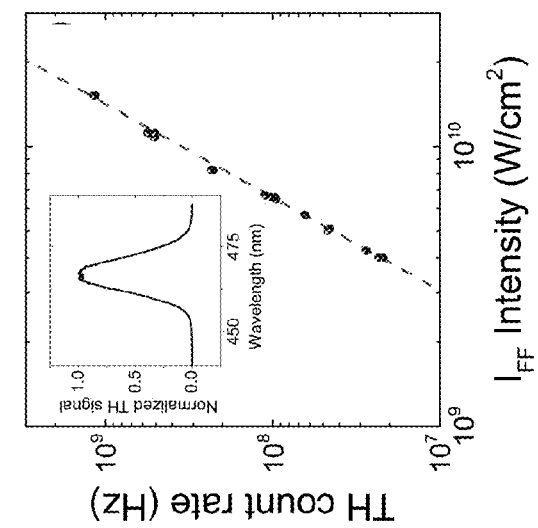
Figure 2C:
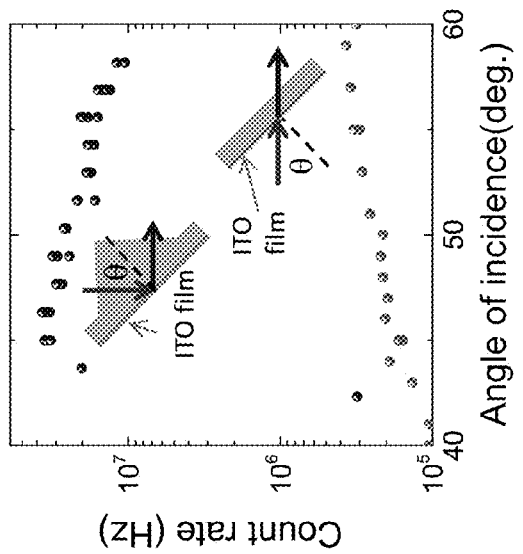

In this example, the fundamental pump beam was derived from a femtosecond optical parametric amplifier pumped by a Ti:sapphire regenerative amplifier. The pump wavelength can be tuned in the vicinity of the ENZ wavelength of ITO. This source delivered an average power of about 6-10 mW (depending on the wavelength) with a pulse repetition rate of 100 KHz and a typical pulse width of 50 fs FWHM. The beam was focused with a 75 mm focal length lens to a near Gaussian spot, with full width at 1/e$^2$ of about 80 μm, as measured using an up-conversion CCD camera. A 5 mm prism (matched to the glass substrate) in the Kretschmann geometry was used to excite the ENZ mode near the glass-to-air critical angle. Due to in-plane momentum conservation and low dispersion of the prism, a reflected third harmonic wave emerges nearly collinearly with the specularly reflected fundamental wave. The harmonic light was visible to a dark-adapted naked eye when projected on a white card. After the fundamental wave was rejected using a 2 mm thick Schott glass BG40 short-pass (SP) filter, the third harmonic radiation was collected by a lens and focused onto a fiber-coupled imaging spectrometer equipped with a liquid nitrogen cooled CCD camera. The inset of FIG. 2(a) shows the TH spectrum for the case of a 1.4 μm fundamental wavelength. As expected for a third harmonic process, the TH spectrum peaks at ~470 nm. Also as expected for third harmonic generation, the intensity of the third harmonic output has a pump intensity dependence of $I_{FF}^{2.0\pm0.12}$, as shown in the graph of FIG. 2(a). To verify that the harmonic yield depends on the coupling to the ENZ mode, the incident wavelength and angle was varied, and in all cases the third harmonic yield declines when the excitation condition deviates from the optimal coupling condition, as shown in FIG. 2(b). A mere shift of the pump wavelength by 100 nm from the optimum 1.4 μm to 1.3 μm reduces the TH emission by nearly a factor of 2. At the maximum average pump power of 6 mW (pulse peak intensity of $2 \times 10^{10}$ W/cm$^2$), 20 nW of third harmonic was obtained, which implies a conversion efficiency of $3.3 \times 10^{-6}$, an impressive value given the sub-wavelength dimensions of the ITO layer. The third harmonic efficiency was also measured in the non-Kretschmann geometry, with incidence from air onto the ITO films, and was found to be ~200 times smaller than the TH from the Kretschmann geometry, as shown in FIG. 2(c). Finally, the measurements were repeated without the ITO sample in place and it was found that the TH generation from the prism glass only was more than four orders of magnitude smaller than the ITO contribution.

From a theoretical perspective, the waves radiated at the TH frequency can be obtained by solving the inhomogeneous Helmholtz equation using the nonlinear polarization as the source term:

$$\nabla \times \nabla \times E_{TH} - \omega_{TH}^2/c^2 \varepsilon_{TH} \cdot E_{TH} = \omega_{TH}^2 \mu_0 P_{TH} \quad (1)$$

where $E_{TH}$ is the TH electric field, $\varepsilon_{TH}$ is the relative permittivity tensor at the TH frequency, $\omega_{TH}$ is the TH angular frequency and $P_{TH}$ is the TH nonlinear polarization density, i.e., the source of the TH signal. The solution of this inhomogeneous equation can be expressed as the superposition of a TH free wave that is the solution of the homogeneous wave equation (assuming $P_{TH}=0$ in the Helmholtz equation) and travels at the TH phase and group velocity, and TH bound waves that are particular solutions related to the presence of the inhomogeneous term $\omega_{TH}^2 \mu_0 P_{TH}$ and locked to the pump field. See N. Bloembergen and P. S. Pershan, *Physical Review* 128, 606 (1962). The existence of the inhomogeneous waves in lossy, negative permittivity and negative index materials has been theoretically and experimentally verified. See V. Roppo et al., *Physical Review A* 76(3), 033829 (2007); V. Roppo et al., *Metamaterials* 2(2), 135 (2008); M. Centini et al., *Physical Review Letters* 101(11), 113905 (2008); and E. Fazio et al., *Optics Express* 17(5), 3141 (2009).

The source term appearing in the Helmholtz equation (1) stems from the nonlinear mixing of the forward and backward pump waves in the ENZ film which generates four polarization waves at the third harmonic frequency which are locked to the fundamental electric fields. Thus, the nonlinear polarization density at the TH frequency is given by (adapting the results from Bloembergen and Pershan to the case of TH generation):

$$P_{TH} = e^{i3k_x^{inc} x} \varepsilon_0 \chi^{(3)}(\omega_{TH}, \omega_{FF}, \omega_{FF}, \omega_{FF}) \cdot \begin{bmatrix} E_+ E_+ E_+ e^{i3k_z z} + \\ 3E_+ E_+ E_- e^{ik_z z} + \\ 3E_+ E_- E_- e^{-ik_z z} + \\ E_- E_- E_- e^{-i3k_z z} \end{bmatrix} \quad (2)$$

where $k_x^{inc}$ is the transverse component of the incident fundamental-frequency (FF) wave-vector at the FF angular frequency $\omega_{FF}$, $\chi^{(3)}(\omega_{TH}, \omega_{FF}, \omega_{FF}, \omega_{FF})$ is the nonlinear susceptibility tensor, $k_z$ is the longitudinal (z-direction) component of the FF wave-vector in the ITO film and $E_{+/-}$ are the complex amplitudes of the forward (+) and backward (−) FF waves (see FIGS. 3(a)-(c) for a pictorial view of these waves). See N. Bloembergen and P. S. Pershan, *Physical Review* 128, 606 (1962). In the undepleted pump approximation (i.e. the TH generation does not cause pump depletion), $E_{+/-}$ may be found using the linear transfer matrix technique at the FF. In Eq. (2), a purely forward bound wave with wavevector $k^I = 3k_x^{inc}\hat{x} + 3k_z\hat{z}$ and amplitude dependent only on the forward component of the pump wave and a purely backward wave with wavevector $k^{IV} = -3k_x^{inc}\hat{x} - 3k_z\hat{z}$ with amplitude dependent on the backward component of the pump signal can be identified. The other two bound waves originate from the mixing of the forward and backward pump waves. Hence their wavevectors are $k^{II,III} = 3k_x^{inc}\hat{x} \pm k_z\hat{z}$. The polarization waves then radiate two homogeneous or free TH waves that propagate in the forward and backward directions following the usual Snell's refraction law in the ITO film. Interestingly, the four inhomogeneous waves in Eq. (2) are equally important for the nonlinear interaction when the ENZ mode is excited, and give similar contributions to the overall TH generation efficiency.

Solution of the inhomogeneous Helmholtz equation (1) for the fields radiated at the harmonic frequency computed via full-wave simulations are shown in FIG. 3(b) as dashed lines and provide excellent agreement with the experimental results. See N. Bloembergen and P. S. Pershan, *Physical Review* 128, 606 (1962). In these simulations, a dispersionless, nonlinear tensor with only three, equal nonzero terms was assumed for frequencies around the ENZ frequency: $\chi_{xxxx}^{(3)} = \chi_{yyyy}^{(3)} = \chi_{zzzz}^{(3)} = \chi$, and the best agreement with the experimental results was achieved when $\chi = 3 \cdot 10^{-21}$ m$^2$/V$^2$, which is in good agreement with previous estimations. See N. Ueda et al., *Applied Physics Letters* 59, 502 (1991). The choice of a nonlinear tensor is valid only around the ENZ frequency, and is justified by the fact that, under the monochromatic excitation of the ENZ mode, the dominant nonlinear polarization component originates from the tensor element $\chi_{zzzz}^{(3)}$, which couples with the cube of the longitudinal field $E_z$ at the pump frequency. The same assumption was also made in Capretti et al. See A. Capretti et al., *Opt. Lett.* 40, 1500 (2015).

Figures 4A, 4B:
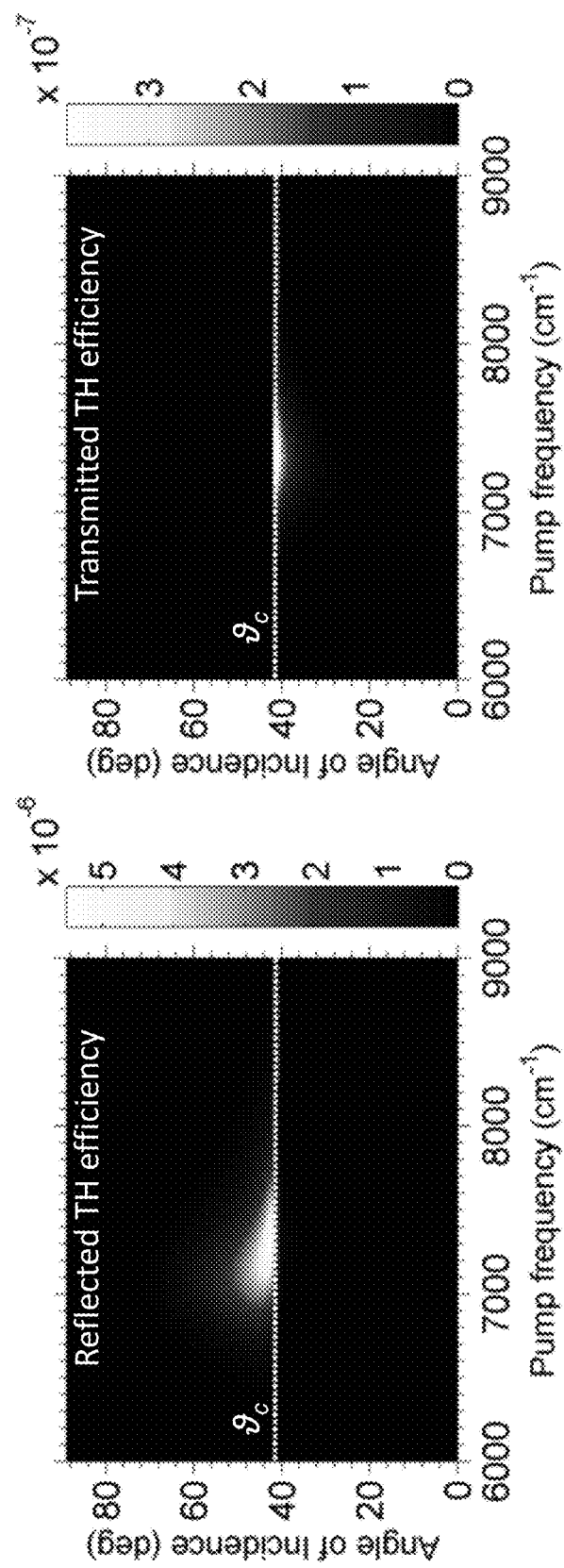
FIG. 4(*a*) is a graph of the reflected TH efficiency versus frequency and angle of incidence from full-wave simulations.

In FIGS. 4(a) and 4(b) are shown maps of theoretical TH conversion efficiencies as a function of frequency and angle of incidence obtained via full-wave simulations. The efficiency is calculated as $\eta^{T,R} = P_{TH}^{T,R}/P_{FF}$, where $P_{TH}^{T,R}$ is either the TH power transmitted to the air side or reflected back to the prism, and $P_{FF}$ is the input FF power. Both efficiency maps display peaks near the ENZ crossing point of ITO (~1.385 μm or 7220 cm$^{-1}$), where pump absorption and field enhancement are maximized. The peaks also have angular selectivity, showing a strong maximum close to the glass/air critical angle (~41.8 degrees, indicated as white dashed lines in the theoretical maps). The transmitted TH peak just below the critical angle is more than an order of magnitude smaller than the reflected TH peak a few degrees above the critical angle. Note that these predictions are valid when the TH process does not deplete the pump and provided nonlinear saturation and self-phase modulation effects are not significant—approximations that are amply justified in the case under investigation.

Figures 5A, 5B:
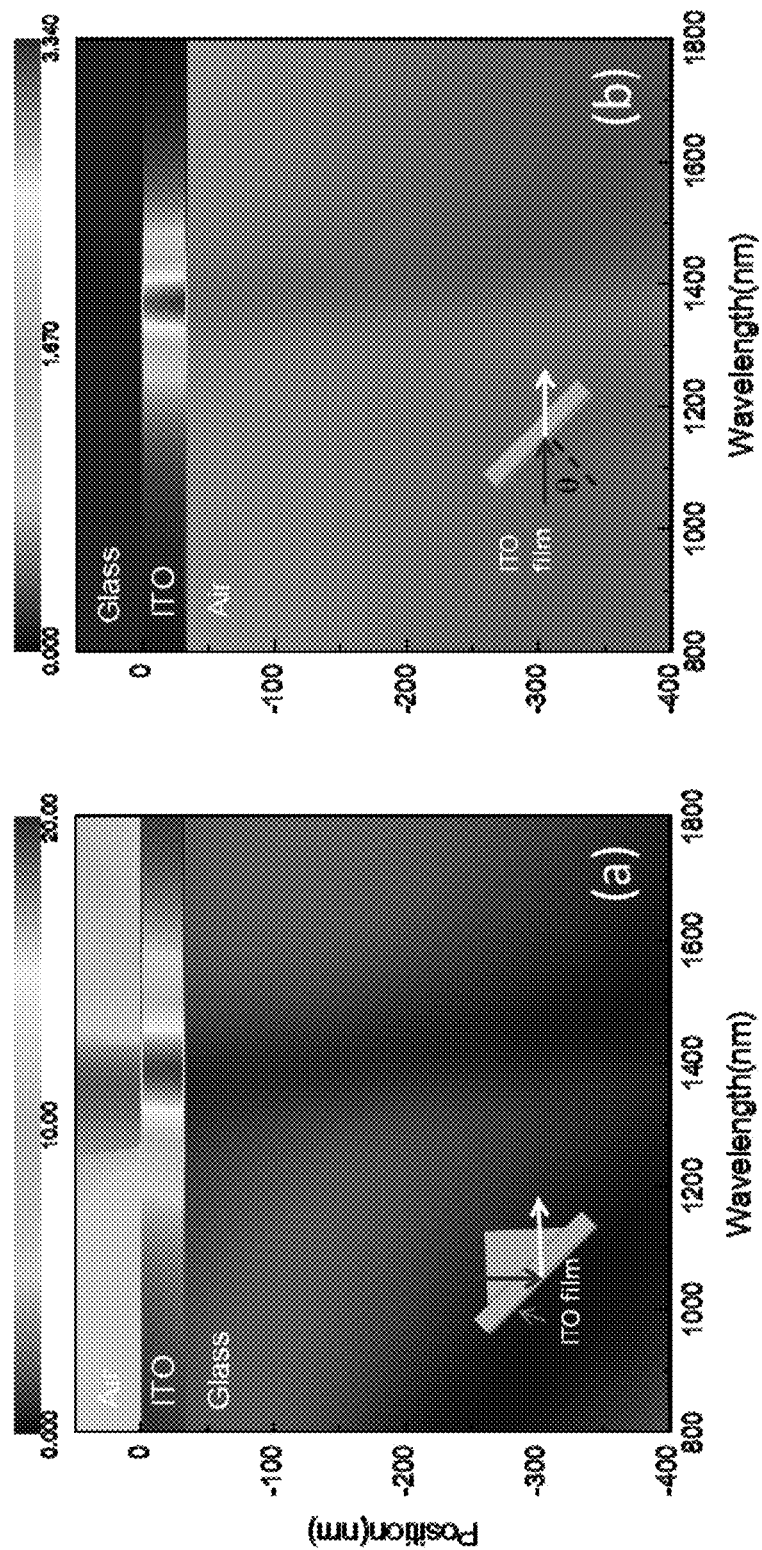
FIG. 5(*a*) is a graph of the spatial and wavelength dependence of $|E_z|^2$ at an angle of incidence of 43.7 degrees

To further probe the origin of the enhanced TH generation, the profile and magnitude of the electric field intensity within the ITO film were compared for both the Kretschmann and non-Kretschmann excitation geometries. It is known that a thin plasmonic material supports long and short range surface plasmon modes. See E. N. Economou, *Physical Review* 182, 539 (1969). As the thickness of the film shrinks into the deeply sub-wavelength regime, the long range surface plasmon mode evolves into the so-called ENZ mode, similar to the one discussed in Vassant et al. See S. Vassant et al., *Opt Express* 20, 23971 (2012). The ENZ mode utilized in the present invention differs from that of Vassant et al., due to the difference in the substrate (metal in Vassant et al. and glass in the present invention). FIGS. 5(a) and 5(b) show the longitudinal electric field intensity (i.e. $|E_z|^2$) obtained from FDTD simulation as a function of wavelength for an incidence angle of 43.7 degrees for the Kretschmann and non-Kretschmann excitation schemes (the transverse electric field intensity is negligible), respectively. Enhancement of the intensity within the film is clearly seen near the ENZ wavelength for both configurations. However, the field intensity is almost six times larger for the Kretschmann scheme, due to its ability to couple to the ENZ mode which lies to the right of the light line. Since the TH emission scales roughly as the intensity cubed, this observation is consistent with our experimental observation of ~200 times larger TH from the Kretschmann geometry. Further, the field intensity is nearly constant across the ITO film, in agreement with what is expected for an ENZ mode. See S. Vassant et al., *Opt Express* 20, 23971 (2012).

In general, optical frequency multiplication involves photons interacting with a nonlinear material are effectively combined to form new photons with greater energy, and thus higher frequency (and shorter wavelength). The above example described pumping at a fundamental frequency to generate third harmonic light using a nonlinear third-order process. Further, second harmonic light can be similarly generated in a material that lacks centro-symmetry, such as GaAs. Second harmonic generation involves pumping at a fundamental frequency to generate second harmonic light via a nonlinear second-order process. This inherently means that the field enhancement arising from the ENZ mode will be at play when the medium supports a non-zero second order nonlinear susceptibility, e.g. in non-centrosymmetric materials such as GaAs.

Conversely, a nonlinear process can be used to split photon beams into pairs of photons that have combined energies and momenta equal to the energy and momentum of the incident photon and are phase-matched in the frequency domain. This spontaneous down-conversion is in a sense the opposite process to harmonic generation: the pump is injected at the fundamental to generate a subharmonic signal. The field enhancement arises from the ENZ mode which can be at the fundamental or subharmonic frequency. This effect can be applied more generally to a four-wave mixing process whereby interactions between two or three wavelengths produce two or one new wavelengths. For example, this down-conversion process can be used as a source of entangled photon pairs.

Finally, optical rectification can also be achieved via a nonlinear optical process. Optical rectification is similar to optical down conversion and consists of the generation of a quasi-DC polarization in a nonlinear medium at the passage of an intense incident beam. This rectification could be achieved using a non-linear second-order or third-order optical process, as described above. In particular, net direct current can be produced by difference frequency mixing to create a field of near-zero frequency when the intensity of the incident light varies. For example, optical rectification can be realized when the ENZ material is deposited on metal or semiconductor due to hot carrier injection. Hot electrons are created when a photon of the incident light at the plasma frequency strikes a semiconductor or metal. The energy from the incident photon can be transferred to a plasmon, enabling electrons to jump over a barrier such that their energies to be harvested for work.

The present invention has been described as a photon energy conversion by near-zero permittivity nonlinear materials. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for photon energy conversion, comprising:
providing a thin film of a material having an epsilon-near-zero polariton mode at a plasma frequency at which the dielectric permittivity is near zero on a substrate; and
coupling incident light into the thin film from the substrate side under a total internal reflection condition, the incident light having a frequency equivalent to the plasma frequency to the epsilon-near-zero polariton mode of the thin film, thereby generating light at a different frequency from the incident light by a nonlinear optical process.

2. The method of claim 1, wherein the nonlinear optical process comprises a third-order process and the generated light comprises third harmonic light.

3. The method of claim 1, wherein the thin film material comprises a doped semiconductor or conductive oxide.

4. The method of claim 3, wherein the conductive oxide comprises indium-tin-oxide or cadmium oxide.

5. The method of claim 1, wherein the thin film material comprises a plasmonic metamaterial.

6. The method of claim 1, wherein the thin film material comprises a reststrahlen material.

7. The method of claim 1, wherein the thickness of the thin film is less than one-tenth of the wavelength of the incident light.

8. The method of claim 1, wherein the coupling comprises a Kretschmann excitation geometry, wherein the incident light illuminates the thin film above the critical angle of the substrate.

9. The method of claim 1, wherein the nonlinear optical process comprises a second-order process and the generated light comprises second harmonic light.

10. The method of claim 9, wherein the thin film material lacks centro-symmetry.

11. The method of claim 10, wherein the thin film material comprises GaAs.

12. The method of claim 1, wherein the nonlinear optical process comprises a degenerate down-conversion process and the generated light is at a lower frequency than the frequency of the incident light.

13. The method of claim 1, wherein the non-linear process comprises an optical rectification process and the generated light is near zero frequency.

14. The method of claim 13, wherein the thin film material is deposited on metal or semiconductor substrate.

* * * * *